Sept. 8, 1936.  L. M. PERSONS  2,054,039
AIR CONDITIONING SYSTEM
Original Filed Jan. 13, 1933   2 Sheets-Sheet 1
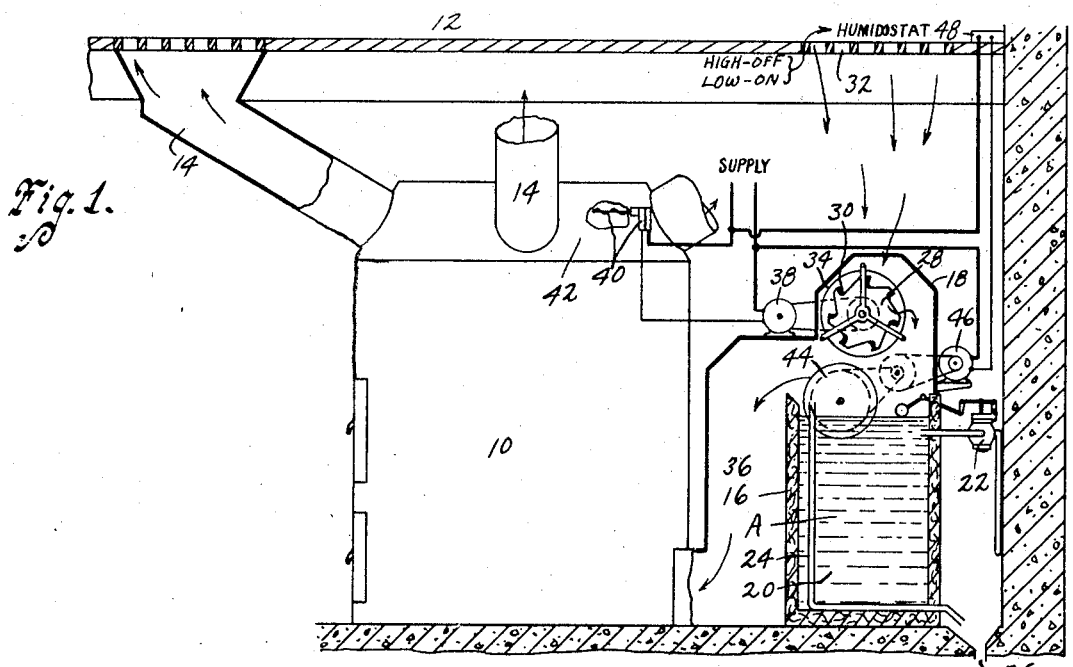
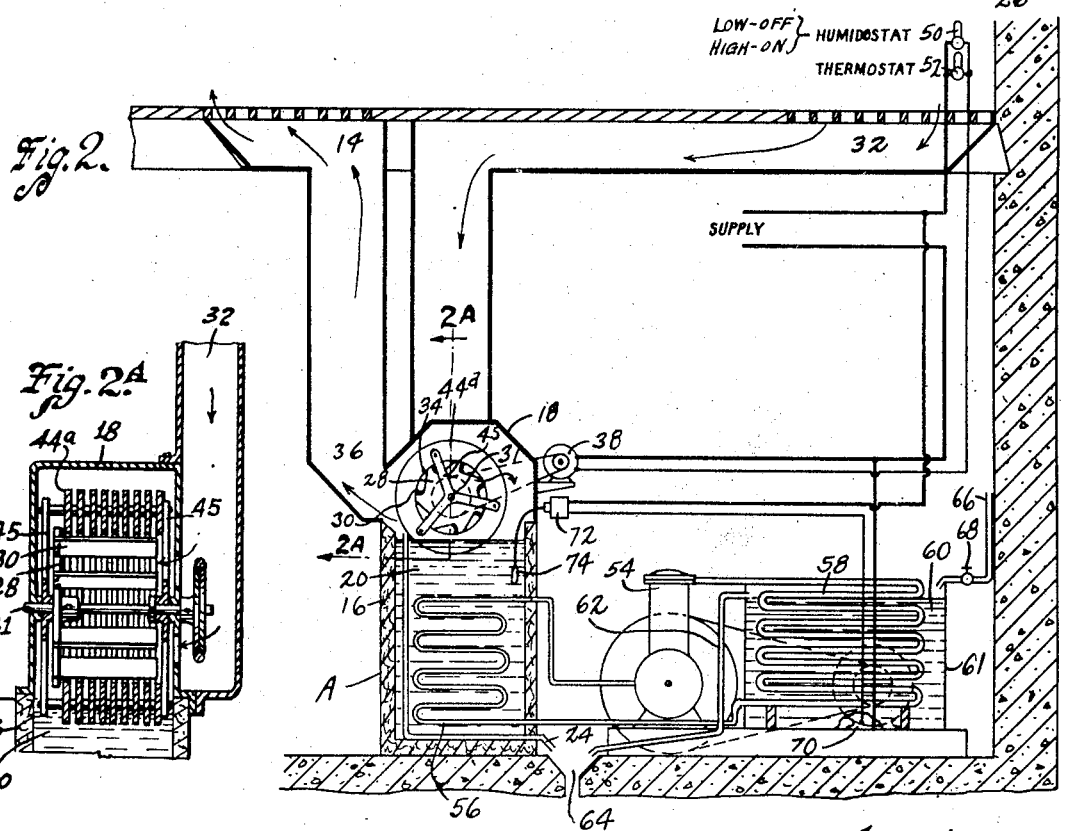
Inventor
~ Lawrence M. Persons ~
By Bair, Freeman & Sinclair
Attorneys
Witness
H. S. Mungenmaier Sept. 8, 1936.  L. M. PERSONS  2,054,039
AIR CONDITIONING SYSTEM
Original Filed Jan. 13, 1933  2 Sheets-Sheet 2
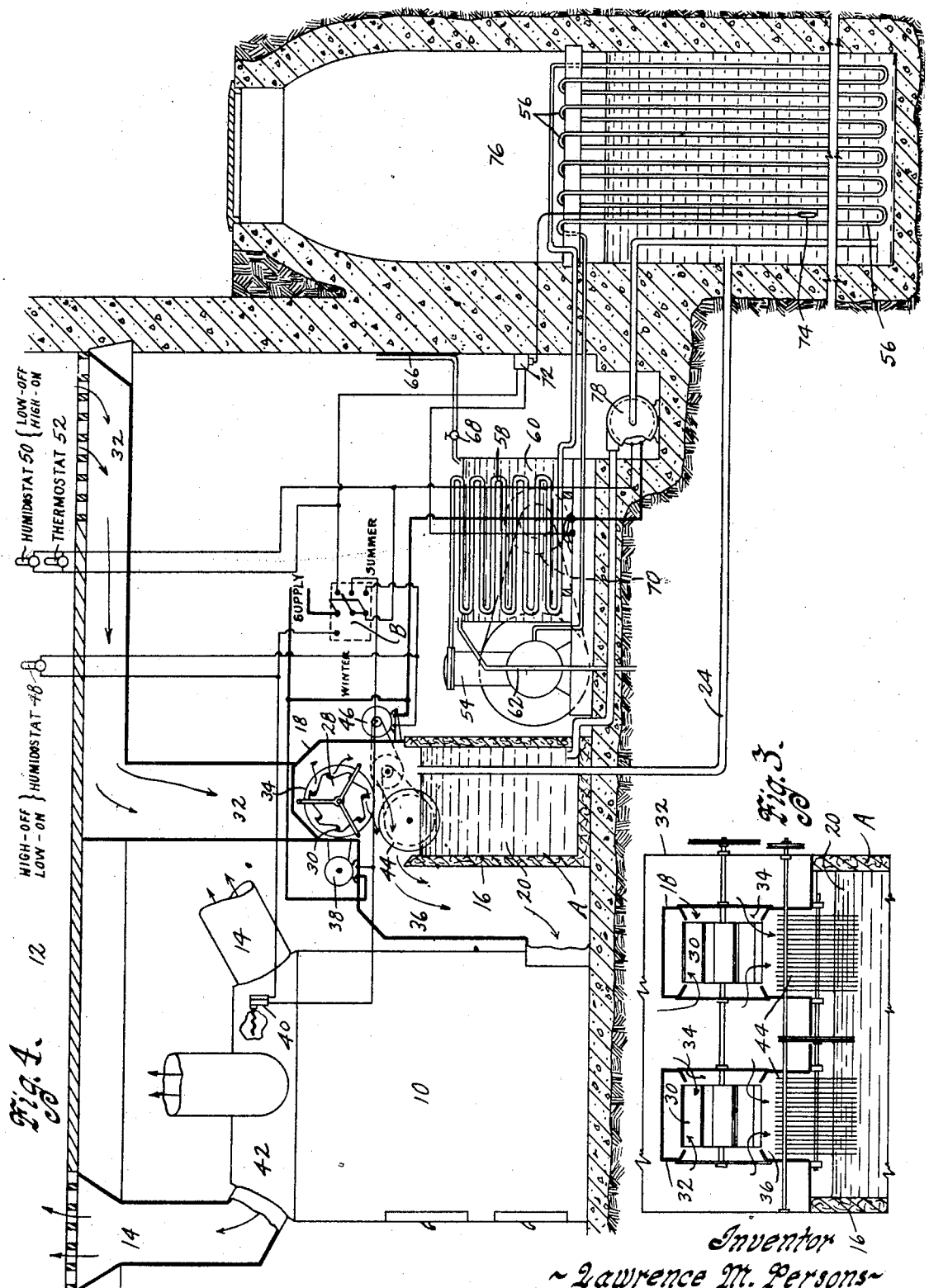

Patented Sept. 8, 1936

2,054,039

UNITED STATES PATENT OFFICE 2,054,039

AIR CONDITIONING SYSTEM

Lawrence M. Persons, Des Moines, Iowa, assignor to Penn Electric Switch Co., Des Moines, Iowa, a corporation of Iowa Application January 13, 1933, Serial No. 651,521
Renewed March 25, 1936

29 Claims. (Cl. 257—3)

The object of my invention is to provide an air conditioning system which is simple, durable and comparatively inexpensive to manufacture.

A further object is to provide an air conditioning system which will heat and humidify air in the winter time and cool and dehumidify it in the summer time, thus providing a year round system for conditioning air.

Still a further object is to provide mechanism for humidifying and heating air in the winter time, a circulating means for the air being provided and it being automatically controlled, with automatic controls being provided for the humidifying operation.

Still a further object is to provide an air conditioning system in which air is circulated and dehumidified in the summer time, temperature and humidity actuated devices being used for automatically controlling the circulation and dehumidification.

Still a further object is to provide a refrigerating apparatus in connection with the dehumidifying mechanism for cooling the air which is circulated.

Still a further object is to provide a system in which automatic controls are provided so that when a manual control is set for winter operation, air circulation, air heating and humidification are automatically controlled, while when set for summer operation, air cooling and dehumidification are automatically controlled.

Still a further object is to provide a dehumidifying and cooling system in which refrigerating apparatus is employed to cool the air, the evaporating coil of the refrigerating mechanism being submerged in a buried receptacle having cooling water therein so that the water is thus insulated by the ground against absorption of heat from the atmosphere.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 diagrammatically shows a system especially designed for circulation and humidification of air and also heating of the air in winter time.

Figure 2 diagrammatically shows a system for cooling and dehumidifying air in the summer time.

Figure 2A is a sectional view on the line 2A—2A of Figure 2 showing the construction of the fan and humidifying unit.

Figure 3 is a diagrammatic view of an air circulating, humidifying and dehumidifying device; and Figure 4 is a diagrammatic view of a system operable for both winter and summer weather.

On the accompanying drawings, a furnace is indicated at 10. A room 12 is indicated thereabove and air is adapted to be heated by the furnace 10 and discharged through pipes 14 to the room 12 and other rooms (not shown) if desired.

In conjunction with the furnace 10, I show an air circulating, humidifying and dehumidifying unit A. This unit comprises a receptacle 16, preferably of insulated material, covered by a hood 18. The receptacle 16 is adapted to contain water 20. The water may be maintained at a proper level by means of a float valve 22. When the height of the water increases above the normal level determined by the float valve because of dehumidifying the air circulating through the system, an overflow pipe 24 provides for draining any surplus to a suitable drain 26 such as a sewer outlet.

Within the hood 18 I provide air circulating mechanism consisting of spiders 28 having blower blades 30 carried thereby. Air is adapted to enter from a cold air register 32 of the room 12 through inlet openings 34 of the hood 18 and then be discharged by centrifugal action into the hood 18 and from there into a cold air pipe 36 of the furnace 10. As shown in Figure 3, the hoods 18 may be made double so as to provide sufficient intake opening area for the blowers.

The blower 30 is adapted to be operated by an electric motor 38. It is controlled by a bonnet switch 40 adapted to be mounted in the bonnet 42 of the furnace 10 so that air circulation will occur when the heated air is at the proper temperature, the blower being idle both when the air is too cold and when it is too hot. The furnace, of course, can be controlled in the ordinary manner from a room thermostat.

For humidifying the air blown from the blower 30 into the cold air pipe 36, I provide disks 44 which constitute humidifying elements or dehumidifying elements in the summer time as will be hereinafter disclosed. The disks, as shown in Figure 3, are mounted on a shaft and there is a considerable number of them so as to provide a large radiating surface for the moisture contained in the film of water adhering to the disks when they are made to rotate. For rotating them, a motor 46 is provided and it is preferably controlled by a humidostat 48 located in the room 12 so that when the humidity is low, the disks will rotate for humidifying the air and when it is high, they will stop rotating. The circulated air, in flowing past the disks, vaporizes a portion of the film of moisture on the disks thus causing humidification.

In Figure 2, I have shown the unit A arranged for cooling and dehumidifying air in the summer time as distinguished from humidifying and warming it in the winter time, as in Figure 1. The fan 30 is used for circulating the air and a slightly different disk arrangement 44a is shown. The disks 44a are carried by spiders 45 which are mounted on a shaft 31 of the blower 30. The disks merely rotate by reason of the friction between the shaft and the spiders. Another factor causing the disks to rotate is the friction of the moving air from the blower 30. This air is caused to rotate by the rotation of the blower and its friction against the disks 44a provides an additional tendency to rotate them over the frictional tendency of the spiders 45 on the shaft 31 to rotate them. This makes rotation of the disks dependent upon rotation of the blower, whereas in Figure 1, rotation of each is independent of the other.

The motor 38 is automatically controlled by both a humidostat and a thermostat which are connected in parallel. The humidostat in Figure 2 differs from the one in Figure 1 in that it is designed for summer use and therefore opens the circuit when the humidity is low and closes it when the humidity is high. The humidostat in Figure 2 is referred to by the reference numeral 50, while the thermostat is referred to as 52.

The humidostat controls the operation of the motor 38 independent of the thermostat 52, while the thermostat controls its operation independent of the humidostat. When the temperature rises above a predetermined degree, such as 80° F., the motor will operate, while below this temperature, it will remain idle unless the humidostat causes its operation.

For cooling the air circulated by the blower 30, I provide a refrigerating system comprising a refrigerant compressor 54, evaporating or cooling coils 56 and a condenser coil 58. The condenser coil is illustrated as being submerged in a tank of water 60 whereby the heat dissipated from the condensing coil may be absorbed by the water and discharged through a drain pipe 62 into the drain 26. By means of a supply pipe 66 and a needle valve 68, cool water is supplied to a tank 61 in which the water 60 is contained. The valve 68 may be automatically opened when operation of the refrigerator is started and closed when it is stopped in the ordinary manner if desired.

For operating the refrigerant compressor 54, I illustrate an electric motor 70 which is automatically controlled by a temperature switch 72 having its temperature responsive bulb 74 submerged in the water 20 of the dehumidifying unit A.

Dehumidification of the air occurs because of the incoming warm air from the register 32 striking the chilled disks 44a which causes condensation of the moisture in the air. The condensate collects on the disks and is deposited with the water 20 during the rotation of the disks. Thus dehumidification occurs when the incoming air is warmer than the disks, coolness of the disks being had by their contact with the cooling water 20 which must be colder than the wet bulb temperature of the room to effect cooling and colder than the dew point temperature thereof to effect dehumidification.

The foregoing description illustrates how my humidifying and dehumidifying unit A can be independently utilized in winter and summer installations. In Figure 4, I illustrate a combined system for both winter and summer operation. The parts of Figure 4 corresponding to those of Figures 1 and 2 have the same reference numerals.

In order to set the system of Figure 4 for heating and humidifying operation in the winter and for cooling and dehumidifying operation in the summer, a double throw switch B may be utilized. In the winter position, the winter humidostat 48 and the bonnet switch 40 control the disk motor 46 and the blower motor 38, respectively, the same as in Figure 1. When the switch is set for summer operation, the humidostat 48 and the bonnet switch 40 are thrown out of the circuit and the summer humidostat 50, thermostat 52 and temperature switch 72 are connected in the circuit for properly controlling the elements of the system in the same manner that these controls operate in Figure 2.

The system of Figure 4 differs from Figure 2 in that the evaporating coil 56 is mounted in a reservoid 76 to and from which the water is circulated by a pump 78. The water during its circulation flows through the receptacle 16 in the summer time. In the winter time the refrigerator does not operate and neither does the pump 78 and since the receptacle 16 is provided for both humidification and dehumidification, it is undesirable to have the evaporating coil 56 mounted therein.

The advantage of having the cooling coil 56 submerged in water in the reservoir 76 lies in the fact that the reservoir is buried in the ground and therefore insulated by the ground against absorption of heat from the atmosphere.

The system of Figure 4, it will be obvious, is complete for the conditioning of air both in winter and in summer. It can be readily set for operation during either season by the switch B but if desired can be automatically controlled by outdoor temperature.

The system is susceptible to various changes and it is my intention to cover by my claims, any modified forms of structure or use of mechanical equivalents, which may be reasonably included within their scope.

I claim as my invention:

1. In an air conditioning system, air circulating mechanism, a receptacle having water therein, an element having portions successively movable into and out of said water, said air circulating mechanism being associated with said element to cause circulation of air past said portions when they are out of said water and means for automatically causing operation or non-operation of said air circulating mechanism and movement or non-movement of said element, said means comprising a thermostat and a humidostat connected in parallel circuit with each other.

2. In an air conditioning system for a room, air circulating mechanism for withdrawing air from said room and discharging it back thereinto, a receptacle having water therein, an element having portions successively movable into and out of said water, said air circulating mechanism being associated with said element to cause circulation of air past the portions thereof out of said water, a pair of means for automatically controlling said air circulating mechanism and the movement of said element, said means depending, one on the humidity and the other on the temperature of the air in said room, means for cooling said water to dehumidify said air when it circulates past said element and automatic means responsive to the temperature of said water for controlling said cooling means.

3. In an air conditioning system for a room, air circulating mechanism, a receptacle having water therein, an element having portions movable into and out of said water, cooling means for cooling said water to a temperature below the net bulb temperature of said room, heating means for the air in said room, a pair of means for automatically controlling the circulation of said air and the movement of said element in the winter and another pair of means for automatically controlling the circulation of said air and the movement of said element in the summer and means for controlling the cooling of said water in summer.

4. In an air conditioning system for a room, air circulating mechanism, a receptacle having water therein, an element having portions movable into and out of said water, cooling means for said water, said cooling means including a buried reservoir for said water and refrigerating mechanism having its evaporating unit submerged therein, heating means for the air in said room, two means for automatically controlling the circulation of said air and the movement of said element in the winter and two means for automatically controlling the circulation of said air and the movement of said element in the summer and means for controlling the cooling of said water in summer.

5. In an air conditioning system for a room, air circulating mechanism, a receptacle having water therein, an element having portions movable into and out of said water, cooling means for said water and one means responsive to the humidity and another means responsive to the temperature of said room for controlling the movement of said element and the circulation of said air and means for controlling the cooling of said water.

6. In air conditioning system for a room, air circulating mechanism, a receptacle having water therein, an element having portions movable into and out of said water, cooling means for said water, heating means for the air in said room, two electric means for automatically controlling the circulation of said air and the movement of said element in the winter, another two electric means for automatically controlling the circulation of said air and the movement of said element in the summer and electric means for controlling the cooling of said water in summer.

7. In an air conditioning system for a room, air circulating mechanism, a receptacle having water therein, an element having portions movable into and out of said water, cooling means for said water, heating means for the air in said room, two electric means for automatically controlling the circulation of said air and the movement of said element in the winter, another two electric means for automatically controlling the circulation of said air and the movement of said element in the summer, electric means for automatically controlling the cooling of said water in summer and a selective switch for setting the various electric means for either winter or summer operation.

8. In an air conditioning system, air circulating mechanism, a receptacle having water therein, an element having portions movable into and out of said water, electric cooling means for said water, a pair of electric means responsive to the humidity and temperature of the circulated air for controlling the movement of said element and the circulation of said air and a third electric means for controlling the cooling of said water.

9. In an air conditioning system, air circulating mechanism, a receptacle having water therein, an element having portions movable into and out of said water, cooling means for cooling said water to a temperature below the wet bulb temperature of the circulated air, heating means for the circulated air, a pair of means for automatically controlling the circulation of said air and the movement of said element in the winter and another pair of means for automatically controlling the circulation of said air and the movement of said element in summer.

10. In an air conditioning system, air circulating mechanism, a receptacle having water therein, an element having portions movable into and out of said water, cooling means for said water, said cooling means including a buried reservoir for said water and refrigerating mechanism having its evaporating unit submerged therein, heating means for the air in said room, two means for automatically controlling the circulation of said air and the movement of said element in the winter and two means for automatically controlling the circulation of said air and the movement of said element in summer.

11. In an air conditioning system, air circulating mechanism, a receptacle having water therein, an element having portions movable into and out of said water, heating means for the air in said room, two electric means for automatically controlling the circulation of said air and the movement of said element in the winter and another two electric means for automatically controlling the circulation of said air and the movement of said element in summer.

12. In an air conditioning system, air circulating mechanism, a receptacle having water therein, an element having portions movable into and out of said water and a pair of electric means responsive to the humidity and temperature of the circulated air and parallel connected with each other for simultaneously controlling both the movement of said element and the circulation of said air.

13. In an air conditioning system, an air circulating mechanism, a receptacle having water therein, an element having portions successively movable into and out of said water, said air circulating mechanism being associated with said element to cause circulation of air past said portions when they are out of said water and means for automatically causing movement or non-movement of said element, said means comprising a thermostat and a humidostat connected in parallel circuit with each other.

14. In an air conditioning system for a room, air circulating mechanism for withdrawing air from said room and discharging it back thereinto, a receptacle having water therein, an element having portions successively movable into and out of said water, said air circulating mechanism being associated with said element to cause circulation of air past the portions thereof out of said water, a pair of means for automatically controlling the movement of said element, said means depending, one on the humidity and the other on the temperature of the air in said room, means for cooling said water to dehumidify said air when it circulates past said element and automatic means responsive to the temperature of said water for controlling said cooling means.

15. In an air conditioning system for a room, air circulating mechanism, a receptacle having water therein, an element having portions movable into and out of said water, cooling means for cooling said water to a temperature below the wet bulb temperature of said room, heating means for the air in said room, means responsive to the temperature of the air adjacent said heating means for automatically controlling the circulation of said air, means responsive to the humidity of the circulated air for automatically controlling the movement of said element in winter, a pair of means for automatically controlling the movement of said element in summer and means for controlling the cooling of said water in summer.

16. In an air conditioning system for a room, air circulating mechanism, a receptacle having water therein, an element having portions movable into and out of said water, cooling means for said water, said cooling means including a buried reservoir for said water and refrigerating mechanism having its evaporating unit submerged therein, heating means for the air in said room, means responsive to the temperature of the air adjacent said heating means for automatically controlling the circulation of said air, means responsive to the humidity of the circulated air for automatically controlling the movement of said element in winter, two means for automatically controlling the movement of said element in summer and means for controlling the cooling of said water in summer.

17. In an air conditioning system for a room, air circulating mechanism, a receptacle having water therein, an element having portions movable into and out of said water, cooling means for said water and one means responsive to the humidity and another means responsive to the temperature of said room for controlling the movement of said element and means for controlling the cooling of said water.

18. In an air conditioning system for a room, air circulating mechanism, a receptacle having water therein, an element having portions movable into and out of said water, cooling means for said water and one means responsive to the humidity and another means responsive to the temperature of said room for controlling the movement of said element.

19. In an air conditioning system for a room, air circulating mechanism, a receptacle having water therein, an element having portions movable into and out of said water, cooling means for said water, heating means for the air in said room, means responsive to the temperature of the air adjacent said heating means for automatically controlling the circulation of said air, means responsive to the humidity of the circulated air for automatically controlling the movement of said element in winter, two means responsive to the humidity and temperature of the circulated air for automatically controlling the movement of said element and means for controlling the cooling of said water in summer.

20. In an air conditioning system for a room, air circulating mechanism, a receptacle having water therein, an element having portions movable into and out of said water, cooling means for said water, heating means for the air in said room, means responsive to the temperature of the air adjacent said heating means for automatically controlling the circulation of said air, means responsive to the humidity of the circulated air for automatically controlling the movement of said element in winter, two means responsive to the humidity and temperature of the circulated air for automatically controlling the circulation of said air and the movement of said element in summer, means for automatically controlling the cooling of said water in summer and a selective switch for setting the various controlling means for either winter or summer operation.

21. In an air conditioning system, air circulating mechanism, a receptacle having water therein, an element having portions movable into and out of said water, electrically operated cooling means for said water, a pair of means responsive to the humidity and temperature of the circulated air for controlling the movement of said element and a third means for controlling the circuit of said electrically operated means.

22. In an air conditioning system, air circulating mechanism, a receptacle having water therein, an element having portions movable into and out of said water, cooling means for cooling said water to a temperature below the wet bulb temperature of the circulated air, heating means for the circulated air, a pair of means for automatically controlling the circulation of said air and the movement of said element in winter and another pair of means for automatically controlling the movement of said element in summer.

23. In an air conditioning system, air circulating mechanism, a receptacle having water therein, an element having portions movable into and out of said water, cooling means for said water, said cooling means including a buried reservoir for said water and refrigerating mechanism having its evaporating unit submerged therein, heating means for the air in said room, means for automatically controlling the movement of said element in winter and two means for automatically controlling the movement of said element in summer.

24. In an air conditioning system, air circulating mechanism, a receptacle having water therein, an element having portions movable into and out of said water, heating means for the air in said room, means for automatically controlling the movement of said element in winter and two means for automatically controlling the movement of said element in summer.

25. In an air conditioning system, air circulating mechanism, a receptacle having water therein, an electrically operated element having portions movable into and out of said water and a pair of means responsive to the humidity and temperature of the circulated air and connected in the circuit of said electrically operated element for controlling the movement thereof.

26. In an air conditioning system for a room, air circulating mechanism, a receptacle having water therein, an element having portions movable into and out of said water, cooling means for cooling said water to a temperature below the wet bulb temperature of said room, heating means for the air in said room, means responsive to the humidity of the circulated air for automatically controlling the movement of said element in winter, a pair of means for automatically controlling the movement of said element in summer and means for controlling the cooling of said water in summer.

27. In an air conditioning system for a room, air circulating mechanism, a receptacle having water therein, an element having portions movable into and out of said water, cooling means for said water, said cooling means including a buried reservoir for said water and refrigerating mechanism having its evaporating unit submerged therein, heating means for the air in said room, means responsive to the humidity of the circulated air for automatically controlling the movement of said element in winter, two means for automatically controlling the movement of said element in summer and means for controlling the cooling of said water in summer.

28. In an air conditioning system for a room, air circulating mechanism, a receptacle having water therein, an element having portions movable into and out of said water, cooling means for said water, heating means for the air in said room, means responsive to the humidity of the circulated air for automatically controlling the movement of said element in winter, two means responsive to the humidity and temperature of the circulated air for automatically controlling the movement of said element and means for controlling the cooling of said water in summer.

29. In an air conditioning system for a room, air circulating mechanism, a receptacle having water therein, an element having portions movable into and out of said water, cooling means for said water, heating means for the air in said room, means responsive to the humidity of the circulated air for automatically controlling the movement of said element in winter, two means responsive to the humidity and temperature of the circulated air for automatically controlling the circulation of said air and the movement of said element in summer, means for automatically controlling the cooling of said water in summer and a selective switch for setting the various controlling means for either winter or summer operation.

LAWRENCE M. PERSONS.